United States Patent [19]

McKinny et al.

[11] Patent Number: 5,627,860

[45] Date of Patent: May 6, 1997

[54] PEAK AND VALLEY DETECTOR FOR A SELECTIVE CALL RECEIVING DEVICE

[75] Inventors: Carol A. McKinny, Delray Beach; Christopher B. Rausch; Mark L. Oliboni, both of Boynton Beach, all of Fla.; Mark R. Whitaker, Pflugerville, Tex.; Mark H. Babcock; Tuan S. Hoang, both of Austin, Tex.

[73] Assignee: Motorola, Inc., Schaumburg, Ill.

[21] Appl. No.: 456,510

[22] Filed: Jun. 1, 1995

[51] Int. Cl.$^6$ ............................................ H04L 25/06
[52] U.S. Cl. ..................... 375/317; 375/316; 375/340; 340/825.44
[58] Field of Search ............................ 375/317, 316, 375/340; 455/226.1; 327/103 P; 340/825.44

[56] References Cited

U.S. PATENT DOCUMENTS

| | | |
|---|---|---|
| 4,896,104 | 1/1990 | Patel et al. ........................... 324/103 P |
| 5,025,251 | 6/1991 | Mittel et al. .......................... 375/317 |
| 5,303,416 | 4/1994 | Morera ................................. 375/317 |
| 5,311,554 | 5/1994 | Morera et al. ......................... 375/310 |
| 5,425,056 | 6/1995 | Maroun et al. ........................ 375/316 |
| 5,436,590 | 7/1995 | Sinard et al. .......................... 375/317 |
| 5,555,452 | 9/1996 | Callaway, Jr. et al. ............... 324/103 P |
| 5,566,213 | 10/1996 | Carsello ................................ 375/340 |

*Primary Examiner*—Stephen Chin
*Assistant Examiner*—T. Ghebretinsae

[57] ABSTRACT

A peak and valley detection system and method are shown for a selective call receiving device (10). The peak and valley detection system quickly and accurately detects and tracks to the peak and valley of a two level and/or four-level signal. A signal value representing a received signal is compared by a CPU (28) to the sum of a peak variable and attack constant. The peak variable is updated to a first value if the received signal value is less than the sum and is updated to a second value if the received signal value is not less than the sum. Similarly, the received signal is compared by the CPU (28) to a difference between a valley variable and attack constant. The valley variable is updated to a third value if the received signal value is greater than the difference value and updated to a fourth value if the received signal value is not greater than the difference value. The peak and valley variables attack and decay at non-constant rates and independently of one another.

68 Claims, 12 Drawing Sheets

PEAK VALUE ——————— LEVEL D  SYMBOL 10

UPPER THRESHOLD - - - - - - - - - - - -

——————— LEVEL C  SYMBOL 11

CENTER THRESHOLD - - - - - - - - - - - -

——————— LEVEL B  SYMBOL 01

LOWER THRESHOLD - - - - - - - - - - - -

VALLEY VALUE ——————— LEVEL A  SYMBOL 00

*FIG. 2*

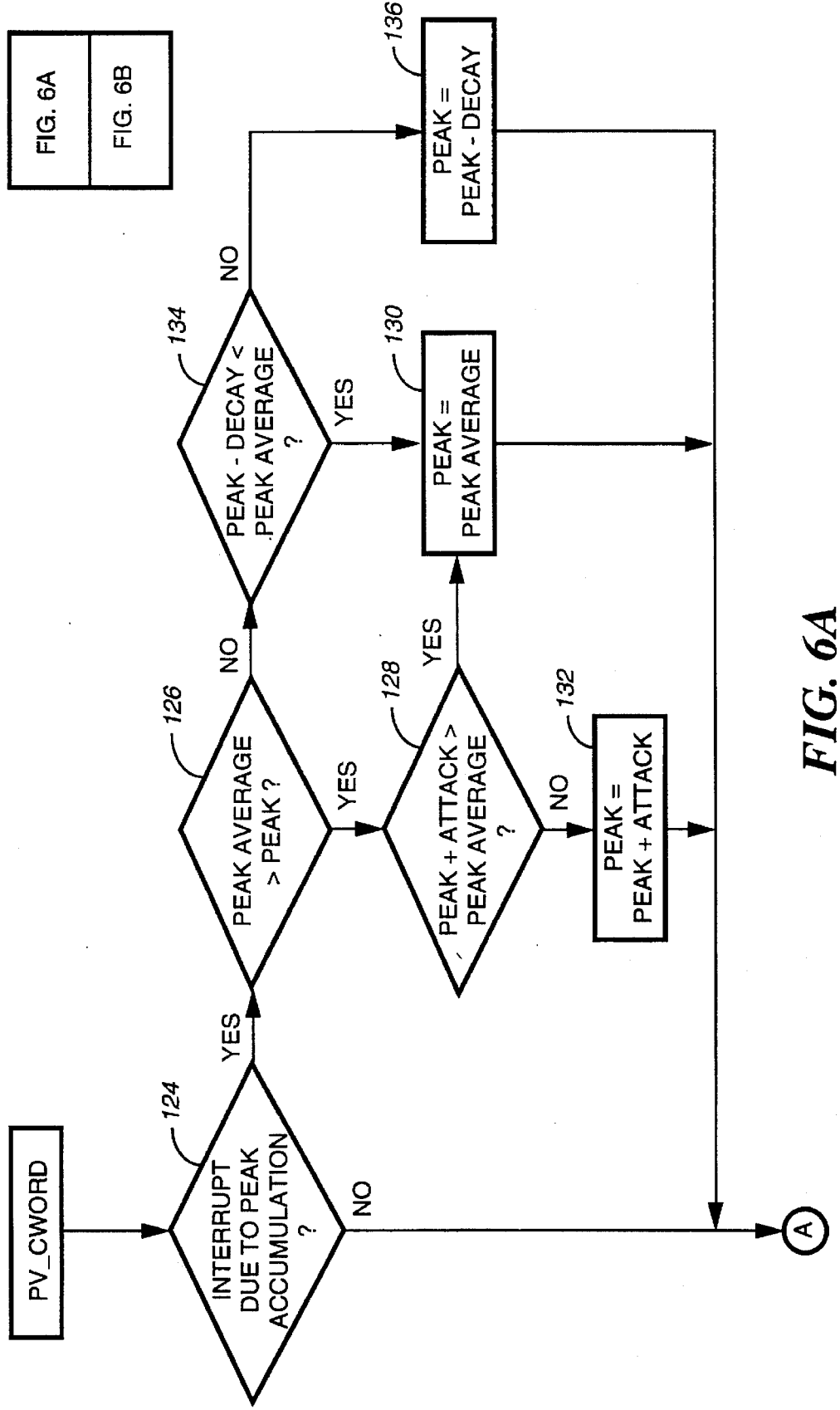

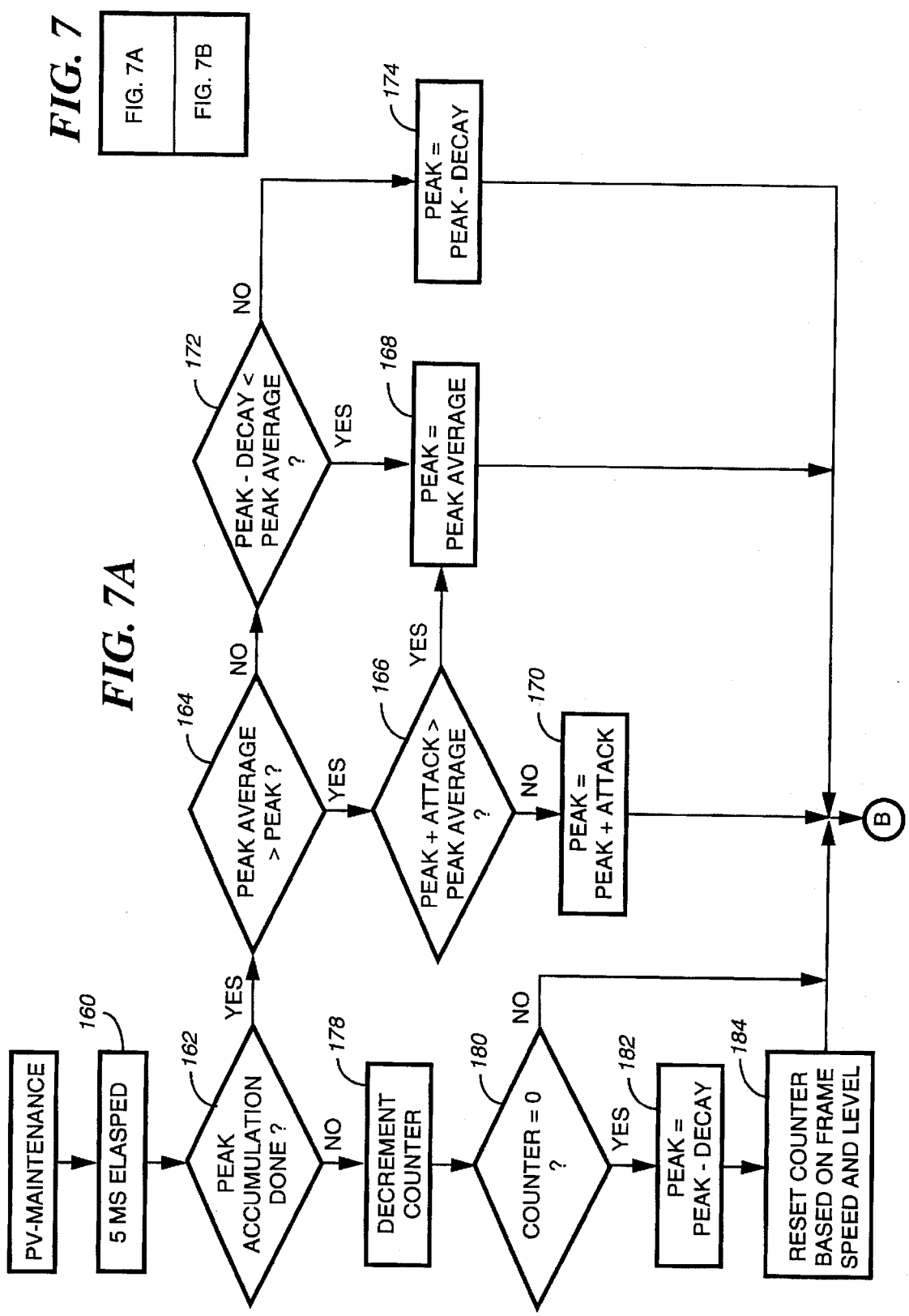

PEAK AND VALLEY DETECTOR FOR A SELECTIVE CALL RECEIVING DEVICE

FIELD OF INVENTION

The present invention relates to a selective call receiving device and more particularly to a selective call receiving device having an improved peak and valley detector that quickly and accurately detects and tracks to the peak and valley of a received signal that may be a two-level signal and/or a four-level signal.

BACKGROUND OF THE INVENTION

Selective call receiving devices are known that include a peak and valley detector to detect the peak and valley of a received signal. Values representing a detected peak and valley are used to derive thresholds to which an incoming signal is compared in order to decode the signal into symbols such as 0, 1 for a two-level signal or into symbols such as 00, 01, 10, 11 for a four-level signal. Examples of known peak detectors are described in U.S. Pat. Nos. 4,631,737 and 5,025,251.

Although known peak detector schemes can adequately detect and track a peak and valley of a two-level signal, four-level signals require even more accurate peak and valley detection and tracking. Problems have arisen when peak and valley detections schemes designed for two-level signals are used for four-level signals. For example, if the incoming signal represents a long string of symbols corresponding to the mid-levels of a four-level signal, peak and valley detectors have been known to track the peak and valley to the mid-level signals as opposed to the outer level signals where the true peak and valley occur. Inadequate tracking of a four-level signal can also occur if the attack and decay of the peak and valley are not accomplished independently.

SUMMARY OF THE INVENTION

In accordance with the present invention, the disadvantages of prior peak and valley detectors for a selective call receiving device have been overcome. The selective call receiving device of the present invention includes an improved peak and valley detector that quickly and accurately detects and tracks to a peak and valley of a received signal that is a two-level signal and/or a four-level signal.

More particularly, the peak and valley detecting system and method in accordance with the present invention includes a receiver for receiving an incoming signal. A signal value representing the received signal is stored in a memory and compared to a sum of a peak variable and an attack constant to determine if the received signal value is less than the sum. In order to update the peak variable so that it represents a detected peak of the received signal, the peak variable is set equal to a first value if the received signal value is less than the sum; whereas the peak variable is set to a second value if the received signal value is not less than the sum, the first value being greater than the second value.

In order to detect a valley, the received signal value is compared to a difference value representing the difference between a valley variable and an attack constant in order to determine if the received signal is greater than the difference value. The valley variable is updated to form a detected valley value by setting the valley variable to a third value if the received signal value is greater than the difference value and by setting the valley variable to a fourth value if the received signal is not greater than the difference value.

In accordance with another feature of the peak and valley detecting system of the present invention, the received signal values used to determine the peak variable and the valley variable may be averages of a number of digital samples representing an analog received signal. To derive the averages, the system may include a control register storing programmable data defining criteria for a digital sample to be averaged into a peak average and for a digital sample to be averaged into a valley average. The system amy also include a peak averaging circuit for providing a peak average by averaging a predetermined number of digital samples meeting the criteria defined by data stored in the control register for a peak average; and a valley averaging circuit for providing a valley average by averaging a predetermined number of digital samples meeting the criteria defined by data stored in the control register for a valley average.

These and other advantages and novel features of the present invention, as well as details of an illustrated embodiment thereof, will be more fully understood from the following description and drawings.

BRIEF DESCRIPTION OF THE DRAWING

FIG. 2 illustrates the signal levels associated with a four-level signal as well as the relationship thereof to peak and valley values as well as to upper, center and lower thresholds;

FIGS. 6A and 6B form a flow chart illustrating a PEAK AND VALLEY C WORD routine called by the routine depicted in FIG. 3;

FIGS. 7A and 7B form a flow chart illustrating a PEAK AND VALLEY MAINTENANCE routine called by the routine depicted in FIG. 3;

DESCRIPTION OF THE PREFERRED EMBODIMENT

Figure 1:
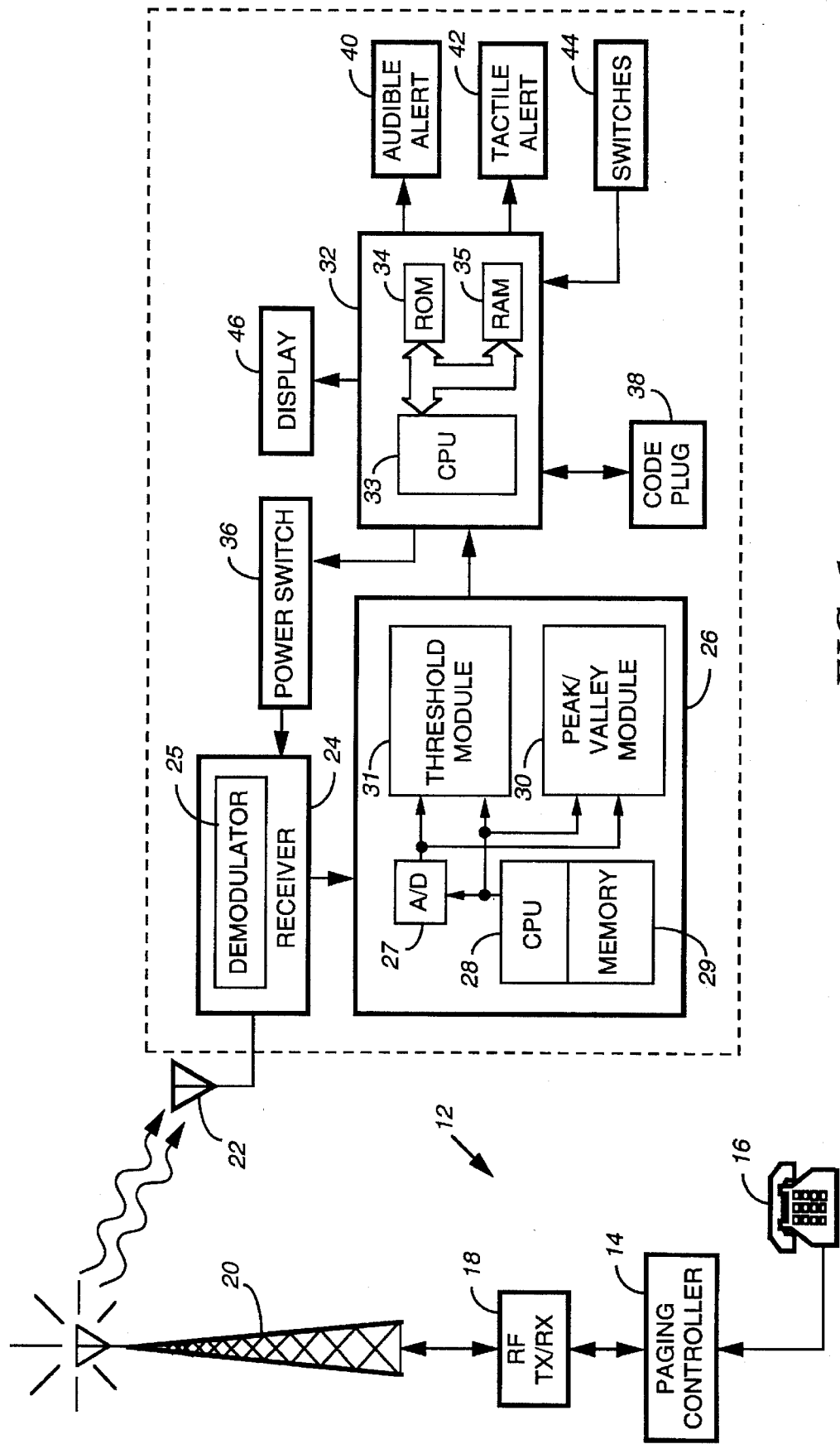
FIG. 1 is a block diagram of a selective call transmitting and receiving network illustrating in detail a selective call receiving device in accordance with the present invention.

A selective call receiving device 10 such as a pager, is illustrated in FIG. 1 as receiving radio frequency (RF) signals from a paging network 12. The paging network 12 includes a paging controller 14 that receives input messages or page initiation messages from an input device such as a telephone 16. The paging controller 14 generates a paging message in accordance with a particular signalling protocol. The signaling protocol may be a four-level protocol such as FLEX described in detail below. However, other signaling protocols may be used with the present invention as well, including signalling protocols with only two levels.

The FLEX protocol has a frame structure that includes a first synchronization portion referred to as Sync 1, followed by a second synchronization portion referred to as Sync 2 which is thereafter followed by four-level FSK data at 6400 bps. The Sync 1 portion of the FLEX frame is a two-level signal that includes 32 bits forming a comma word followed by 32 bits forming a first predetermined synchronization word, referred to hereinafter as the A word. The A word in Sync 1 is followed by 16 bits forming a word designated as the B word. Thereafter, Sync 1 includes 32 bits representing the inverse of the A word and referred to as the $\overline{A}$ word. The $\overline{A}$ word is thereafter followed by 32 bits of frame information. Sync 2 following Sync 1 in the FLEX frame is a four-level signal. Sync 2 includes a comma word formed by 32 symbols selected from the symbols 00, 01, 11 and 10. The comma word in Sync 2 is followed by a second predetermined synchronization word referred to hereinafter as the C word which is formed of eight symbols. Thereafter, a second comma word is formed of 32 symbols followed by eight symbols representing the inverse of the C word, hereinafter referred to as the $\overline{C}$ word. Sync 2 and/or the C word is balanced, having the same number of upper level and mid-upper level symbols that are above a center or middle threshold as the number of lower level and mid-lower level symbols that are below the center threshold as described below with reference to FIG. 2.

The paging message generated by the paging controller 14 is coupled therefrom to a RF transmitter/receiver 18. The RF transmitter/receiver 18 transmits the paging message via an antenna 20 for reception by a particular receiver 10 in accordance with an identification of the particular receiver 10 that is included in the paging message.

The selective call receiver 10 includes an antenna 22 for intercepting transmitted RF signals. The antenna couples the received signals to a receiver 24 that includes a FM demodulator 25. The demodulated analog signal from the receiver 24 is coupled to a decoder 26. The decoder 26 includes an analog to digital converter 27 that converts the analog signal applied thereto into a number of digital samples. The decoder 26 includes a central processing unit (CPU) 28 for processing the digital samples representing the received signal in accordance with software stored in a memory 29 as discussed in detail below. The CPU 28 utilizes a Peak/Valley Module 30 and a Threshold module 31, also discussed in detail below, to provide values to a symbol decoder shown in FIG. 9 for decoding the received signals into symbol bits representing the paging message. These symbol bits are coupled to a controller 32 having a central processing unit 33 that processes the symbol bits of the received paging message in accordance with software stored in a read only memory i.e. ROM 34. A random access memory i.e. RAM 35, is used to store variables derived during processing and to store the received paging message as decoded by the decoder 26. It is noted that the functions of the CPUs 28 and 33 can be performed by one CPU if desired.

The RF signals transmitted by the network 12 for paging applications, for example, typically include a receiver address that identifies a particular selective call receiver 10 as well as an associated alpha and/or numeric message. The controller 32 decodes a received address by comparing it with one or more addresses stored in a code plug or a code memory 38. If the controller 32 detects a match between a received address and a stored address, an alert signal is generated to alert a user that a selective call message or page has been received by the device 10. The alert signal is directed to an audible alerting device 40 for generating an audible alert or to a tactile alerting device 42 for generating a silent vibrating alert. Switches 44 allow the user of the selective call receiving device 10 to, among other things, select between the audible alert 40 and the tactile alert 42 in a manner that is well-known in the art. The switches 44 may also be actuable by a user for causing a message stored in the RAM 35 to be accessed for display on a display 46. The switches 44 may also provide additional functions such as reset, read, delete, etc. A power switch 36 is also coupled to the controller 32 in order to control the supply of power to the receiver 24 thereby providing a battery saving function.

As shown in FIG. 2, a four-level signal may include an upper-level (level D) representing a symbol 10; a mid-upper level (level C) representing a symbol 11; a mid-lower level (level B) representing symbol 01; and a lower level (level A) representing symbol 00, for example. The peak and valley detector portion of the decoder 26, as described in detail below with respect to the flow charts, generates a peak value that ideally corresponds to the upper level; an upper threshold that is used to discriminate between mid-upper level and upper level signals; a center or middle threshold that is used to discriminate between mid-upper level and mid-lower level signals; a lower threshold that is used to discriminate between lower-level and mid-lower level signals; and a valley value that ideally corresponds to the lower level.

Figure 9:
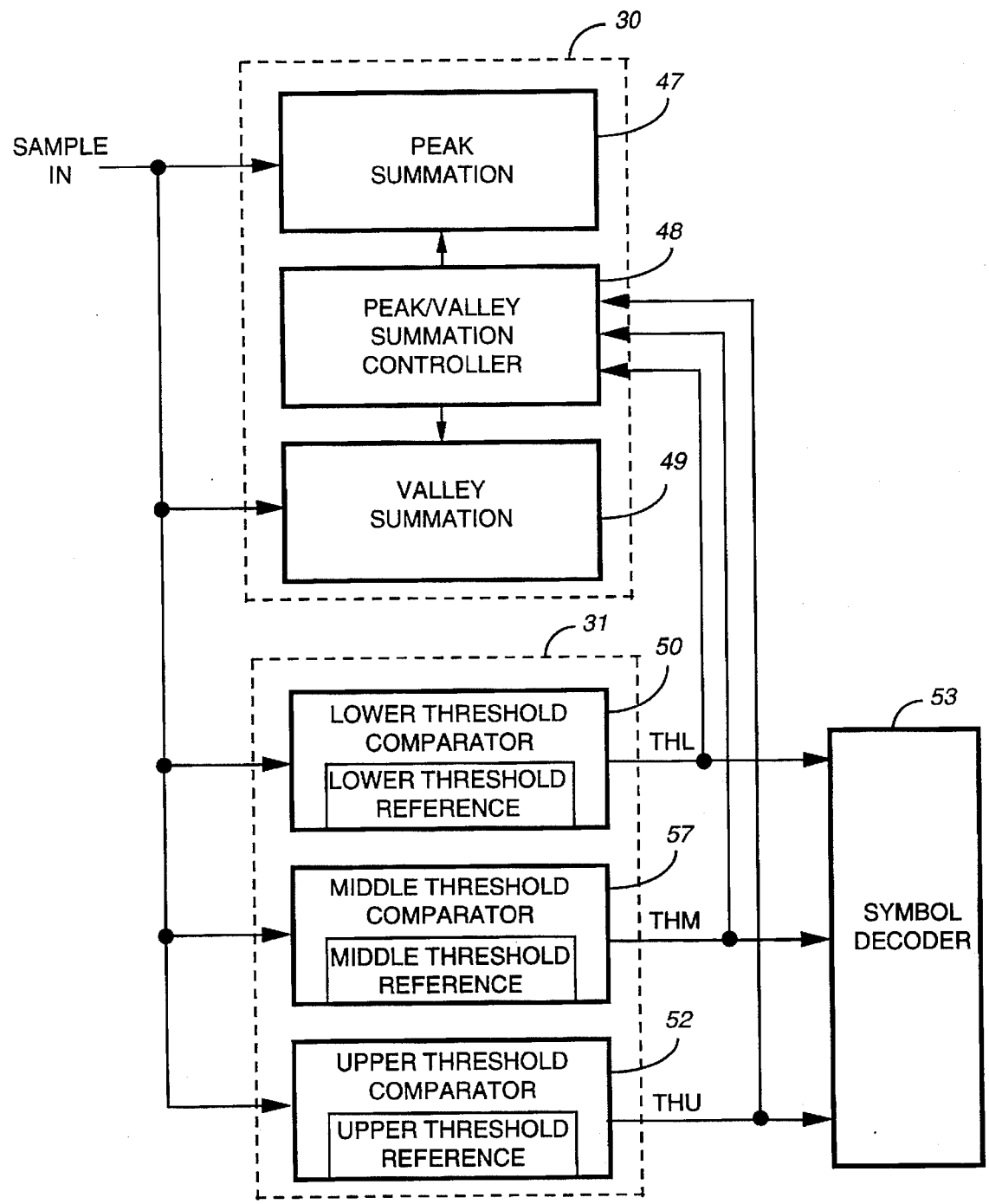
FIG. 9 is a block diagram of the Peak/Valley Module and Threshold Module of FIG. 1.
Figure 10:
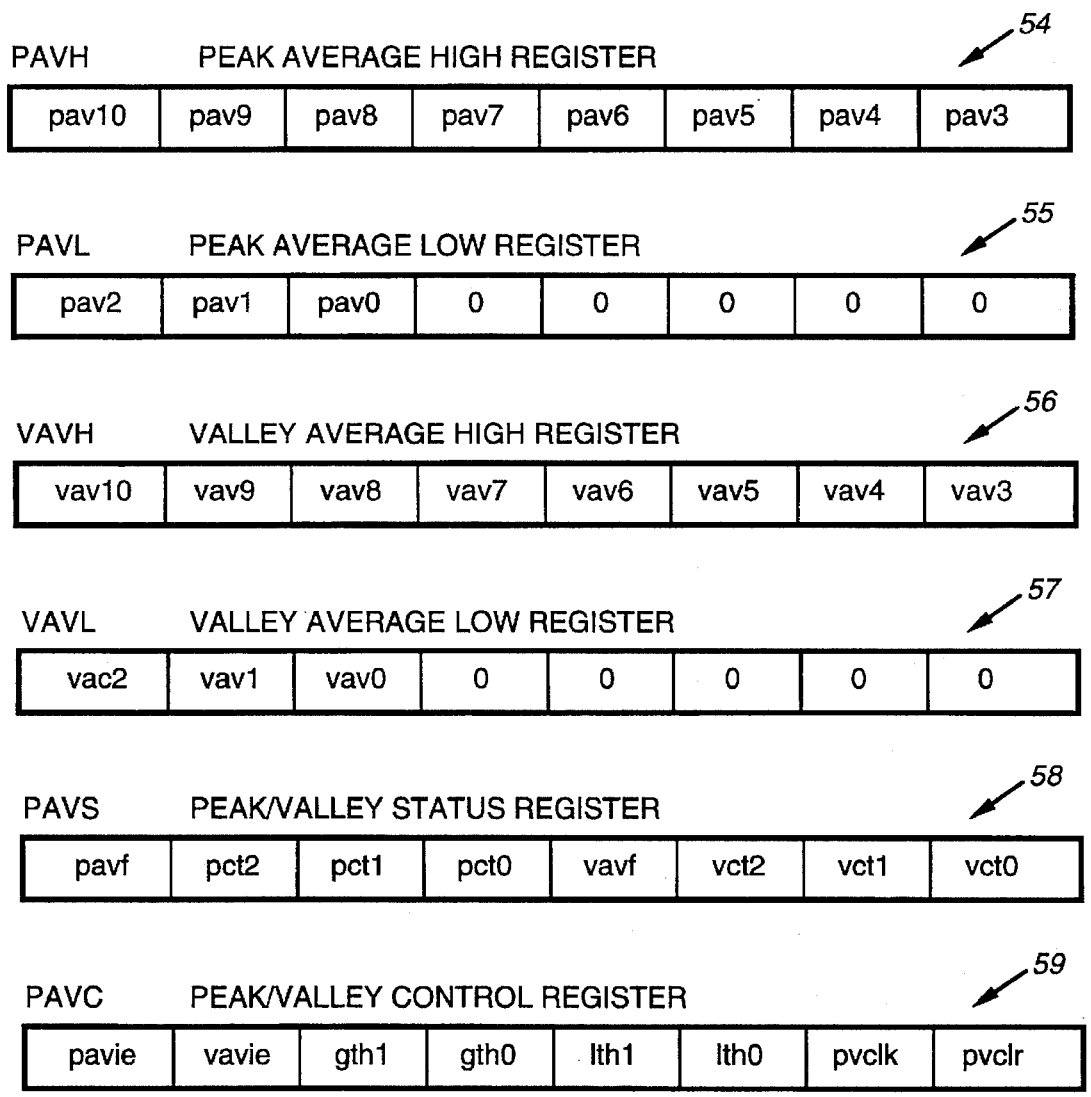
FIG. 10 is an illustration of a number of registers used in the Peak and Valley module of FIGS. 1 and 9.

The peak and valley detection system of the present invention utilizes the Peak/Valley Module 30 and Threshold Module 31 as depicted in FIGS. 9 and 10. The Peak/Valley Module 30 includes a pair of summation circuits, a peak summation circuit 47 and a valley summation circuit 49. Each summation circuit 47, 49 accumulates a predetermined number of digital samples, from the analog to digital converter 27, that meet particular criteria represented by data stored for the respective circuits 47 and 49 in a Peak/Valley Summation Controller 48. The criteria may be based upon one or more signals output from the threshold module 31 or it may be independent thereof as described below. The Threshold module 31 includes a lower threshold comparator 50, a middle threshold comparator 51 and an upper threshold comparator 52 for comparing a digital sample from the analog to digital converter 27 to respective lower, middle and upper threshold reference values, each of which may be set to any eight bit value. Preferably the lower, middle and upper threshold reference values are derived according to the software routines described below. If a sample is greater than a threshold reference value, the respective comparator 50, 51, 52 asserts a respective signal THL, THM, THU at its output. The output signals THL, THM, THU are coupled to a symbol decoder 53. Under the control of the CPU 28, the symbol decoder 53 decodes the digital samples from the analog to digital converter into symbol bits according to their relationship to the lower, middle and upper threshold reference values. The signals THL, THM and THU are also coupled to the Peak/Valley Summation Controller 48 which may be responsive thereto, according to stored criteria data, for controlling whether a particular summation circuit 47, 49 accumulates the sample upon which the comparison was made by the comparators 50–52.

More particularly, the peak summation circuit 47 includes a Peak Average High register 54 and a Peak Average Low register 55 as shown in FIG. 10. The Peak Average High register 54 and Peak Average Low register 55 are used to accumulate the sum of up to 8 samples output from the analog to digital converter 27 that meet an accumulation criteria for peak averaging. The most significant 8 bits of the accumulation process are contained in the Peak Average High register. These 8 bits may be used directly to provide an effective divide by 8 of the accumulated sum. Therefore, when 8 samples are accumulated, the 8 bit value stored in the Peak Average High register represents the average of the samples accumulated. The least significant bits may be read left justified to enable CPU operations to round easily. When 8 samples are accumulated, a peak interrupt is generated by the peak summation circuit 47, the interrupt being used to control the software of the system as described below.

The valley summation circuit 49 similarly includes a Valley Average High register 56 and a Valley Average Low register 57. The Valley Average High register 56 and Valley Average Low register 57 accumulate up to 8 samples with an interrupt being generated when the eighth sample is accumulated. When 8 samples are accumulated in the registers 56 and 57 where register 56 stores the 8 most significant bits, the 8 bit value stored in the Valley Average High register 56 represents the average of the samples accumulated.

As discussed above, the Peak Average High and Low registers 54 and 55 accumulate only those samples that meet the accumulation criteria for a peak average as determined by data stored in the Peak/Valley Summation Controller 48. The criteria may be based on a comparison of the sample to a reference threshold value stored in a respective threshold comparator. For example, in one software routine discussed below, only samples that are above the upper threshold reference value are accumulated in the Peak Average High and Low registers 54 and 55 under the control of the Peak/Valley Summation Controller 48. Alternatively, the criteria may be independent of the threshold comparators, for example, when all samples from the analog to digital converter 27 are to be accumulated. Similarly, the Valley Average High and Low registers 56, 57 accumulate only those digital samples that meet the criteria for accumulation for a valley average as determined by data stored in the Peak/Valley Summation Controller 48. The criteria may be based on a comparison to a threshold reference value stored in a respective threshold comparator or the criteria may be independent of the threshold comparators. For example, the Valley Average High and Low registers 56 and 57 accumulate all samples in accordance with one of the routines of the peak and valley detection system described below; and in accordance with another of the routines, the Valley Average High and Low registers accumulate only those samples that are below a predetermined lower reference value. More specifically, the Peak/Valley Summation Controller 48 includes a Peak/Valley Control register 59 shown in FIG. 10 wherein the bits gth1, gth0 and lth1, lth0 of the Peak/Valley Control register 59 determine the accumulation criteria or the configuration of the averaging calculation performed by the Peak Average High and Low registers 54, 55 and by the Valley Average High and Low registers 56, 57 respectively. For example, if the bits gth1 and gth0 are respectively set to 0 and 0, the peak average registers 54 and 55 will accumulate under the control of the Peak/Valley Summation Controller 48 only those samples that are greater than the upper threshold reference value as determined by the signal THU from the comparator 52. If gth1 and gth0 are respectively set to 0 and 1, the peak average registers will accumulate under the control of the Summation Controller 48 only those samples that are greater than the middle reference value as determined by the signal THM from the comparator 51. If gth1 and gth0 are respectively set to 1 and 0, the peak average registers accumulate all of the samples independent of the output signals of the threshold comparators 50–52; whereas if these bits are respectively set equal to 1 and 1, no samples are accumulated. The bits lth1 and lth0 of the Peak/Valley Control register 59 are similarly set by the CPU 28 to control the accumulation of the Valley Average High and Low registers 56 and 57. If lth1 and lth0 are respectively set to 0 and 0, the Valley Average registers will accumulate under the control of the Peak/Valley Summation Controller 48 only those samples that are less than the lower threshold reference value as determined by the signal THL from the comparator 50. If lth1 and lth0 are respectively set to 0 and 1, the Valley Average registers 56 and 57 accumulate under the control of the Summation Controller 48 only those samples that are less than the middle threshold reference value as determined by the signal THM from the comparator 51. If lth1 and lth0 are respectively set to 1 and 0, the Valley Average registers 56 and 57 accumulate all samples; whereas if these bits are respectively set to 1 and 1, no samples are accumulated.

The bit labeled pavie of the Peak/Valley Control register 59 is an interrupt enable bit as is the vavie bit. The pvclk bit selects the clock source used for sample accumulation and the pvclr bit initiates an accumulation process by clearing the high and low registers and a sample counter. The Peak and Valley Summation Controller 48 also includes a Peak/Valley Status register 58 that stores the current status of an accumulation process and particularly indicates the number of samples that are accumulated. This register also stores flags indicating completion when the process is over. More particularly, the pavf and vavf bits are flag bits respectively indicating that the peak register accumulation process and the valley register accumulation process is completed. The bits pct2, pct1, pct0 represent the number of samples that have been accumulated so far in the peak average registers; whereas the bits vct2, vct1, vct0 represent the number of samples accumulated in the valley average registers.

The information stored in the Peak Average register 54 and in the Valley Average register 56 depicted in FIG. 10 is used by the CPU 28 when operating in accordance with the software routines depicted in FIGS. 3–8 as described below.

Figure 3:
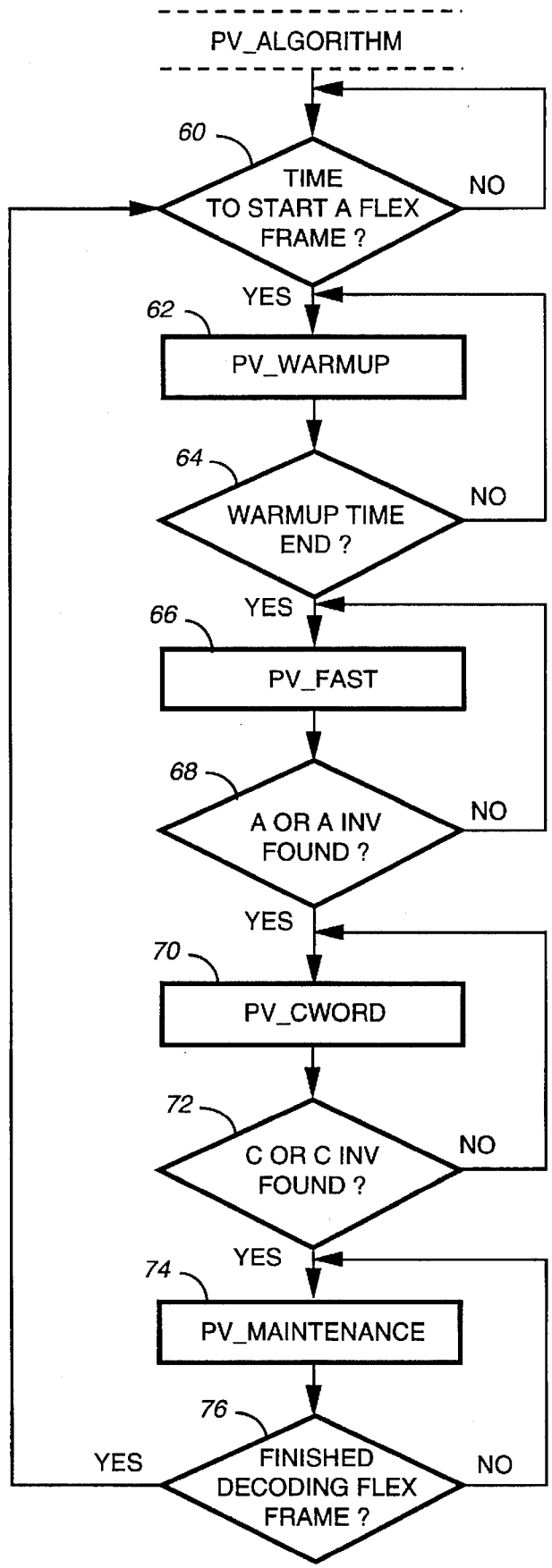
FIG. 3 is a flow chart illustrating the operation of a main routine of the peak and valley detector in accordance with the present invention.
Figure 5:
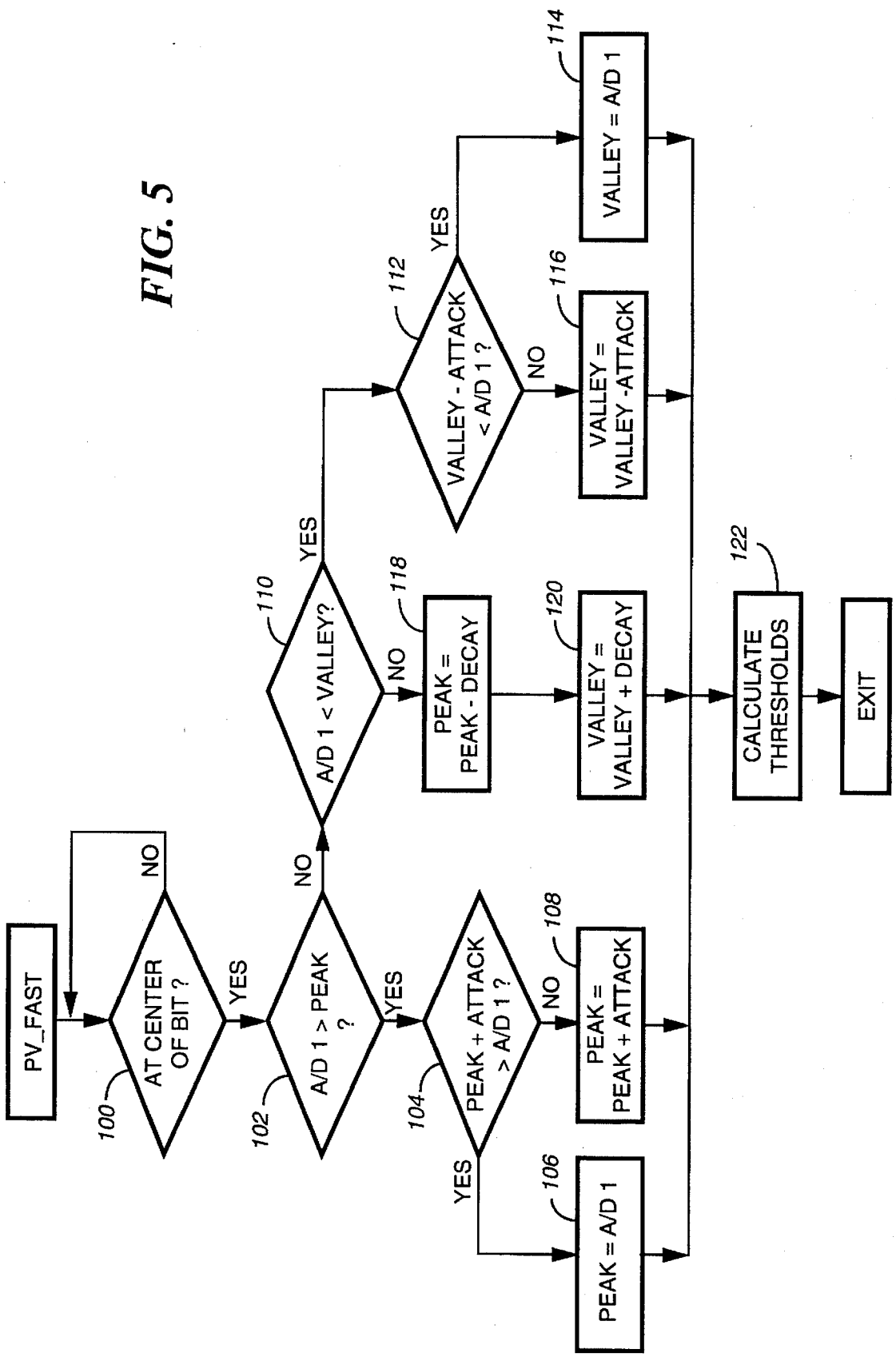
FIG. 5 is a flow chart illustrating a PEAK AND VALLEY FAST routine called by the flow chart illustrated in FIG. 3.
Figure 6B:
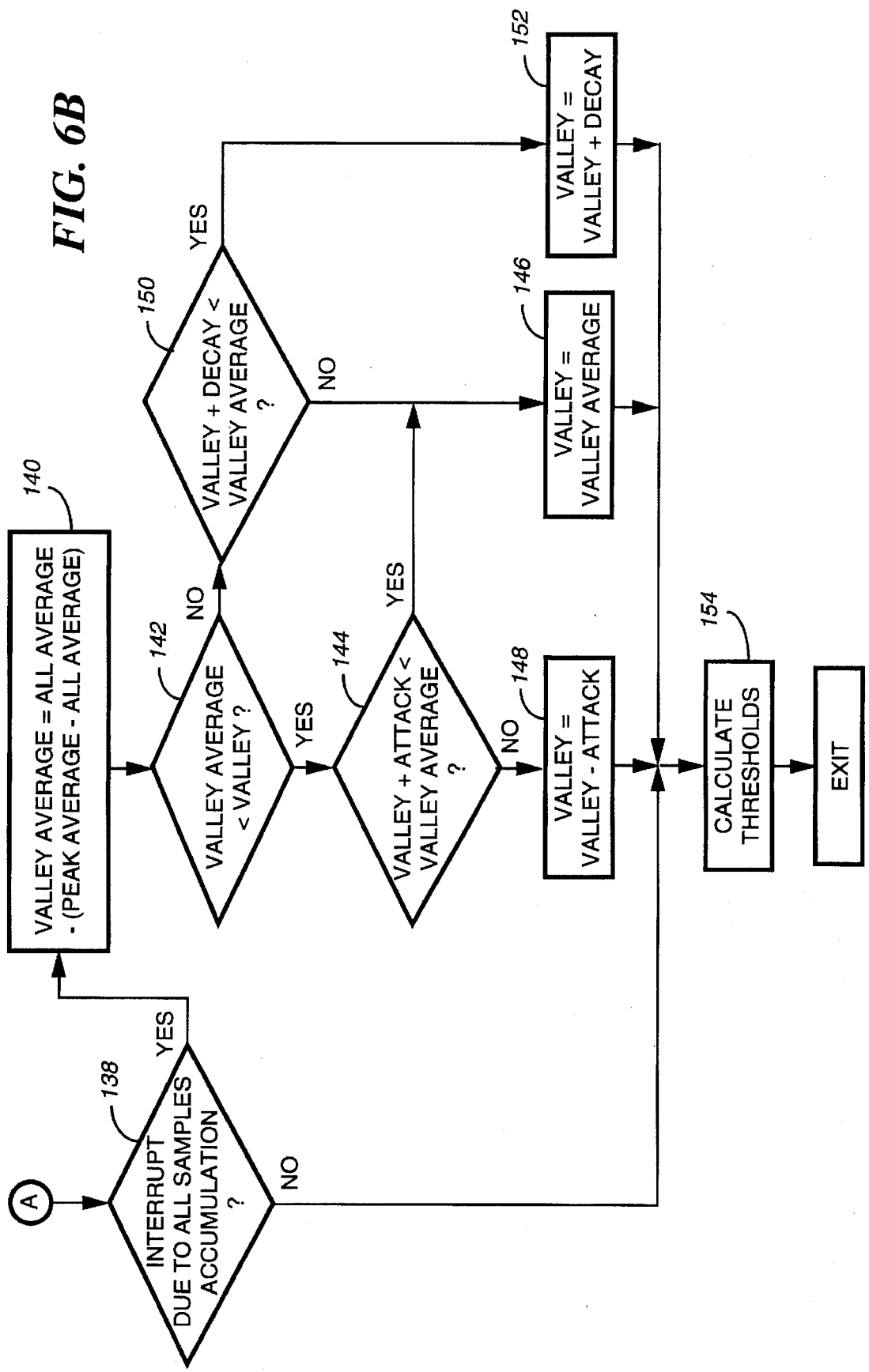
Figure 7B:
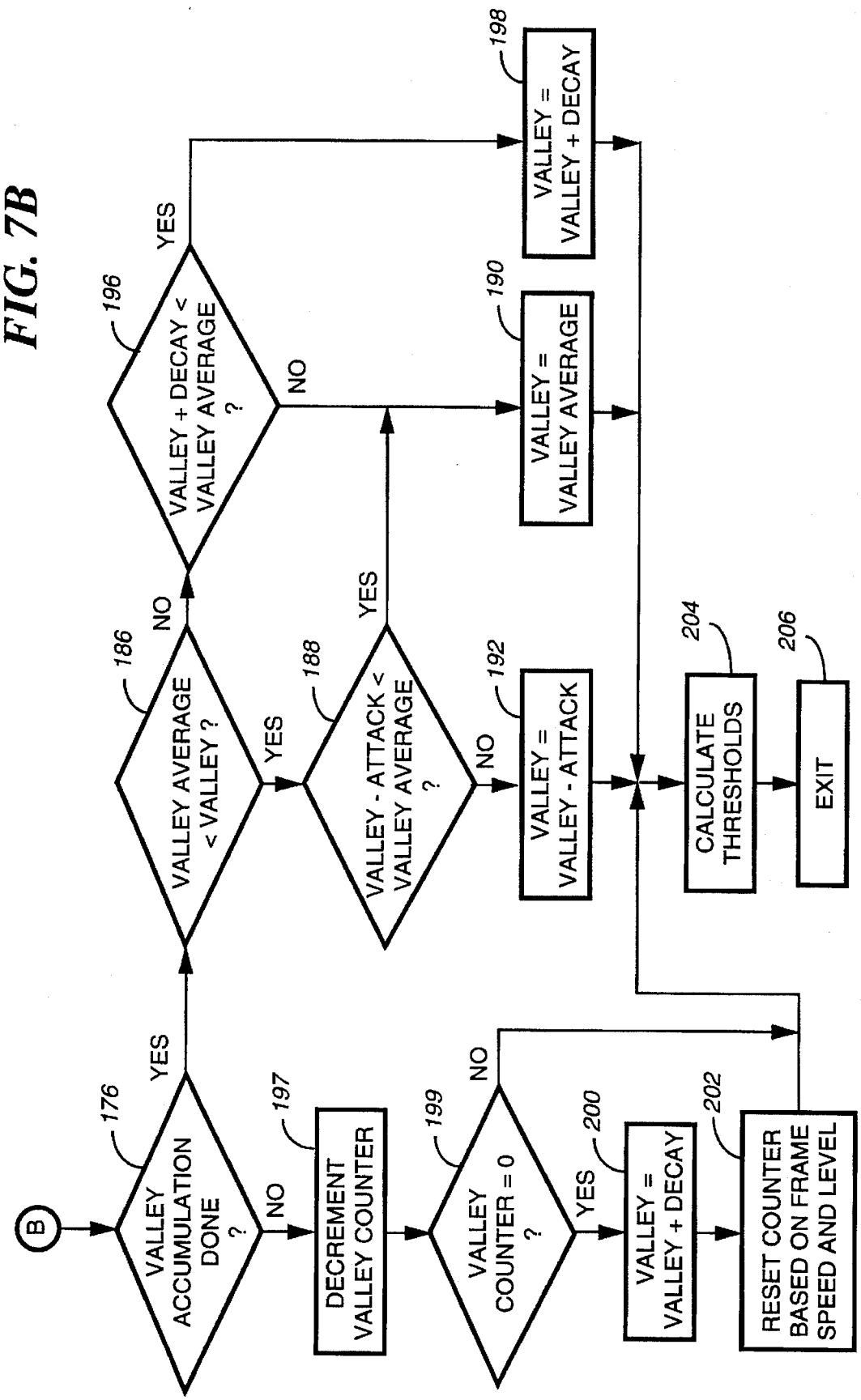

The main peak and valley routine, as depicted in FIG. 3, is executed by the CPU 28 every FLEX frame. At the start of the routine, the CPU 28 at a block 60 determines whether it is time to start a FLEX frame or not. If so, the CPU 28 proceeds to block 62 to call the PEAK AND VALLEY WARM-UP routine depicted in FIG. 4. This routine is used to set initial peak and valley values as well as to calculate initial mid, upper and lower threshold values. The PEAK AND VALLEY WARM-UP routine is executed until the CPU 28 determines at block 64 that the warm-up period is over at which time the CPU 28 proceeds to block 66. At block 66, the CPU 28 calls a PEAK AND VALLEY FAST routine as shown in FIG. 5. The PEAK AND VALLEY FAST routine updates the initialized peak and valley values very quickly while the decoder/controller 26 is trying to obtain synchronization to a given frame. This routine is executed until the CPU determines that the first predetermined synchronization word, the A word or the $\overline{A}$ has been found. The PEAK AND VALLEY FAST routine utilizes a value representing a received signal sample that is stored in the analog to digital converter 27, or a buffer associated therewith, which is adequate for peak and valley detection and tracking for a two-level signal. When the CPU 28 determines that either the A word or the $\overline{A}$ word had been found, the CPU proceeds to block 70 to call a PEAK AND VALLEY C WORD routine as shown in FIGS. 6A–6B at block 70. The PEAK AND VALLEY C WORD routine utilizes the registers depicted in FIG. 9 to provide a received signal value that represents either a peak average accumulated in the Peak Average High and Low registers or a valley average that is based on the peak average as well as an all sample average accumulated in the Valley Average High and Low registers. More specifically, this routine generates a peak value based on a peak average accumulation and calculates a valley average that is based on a center value represented by the all samples average and that further uses the peak average as described in detail below. The PEAK AND VALLEY C WORD routine allows the peak and valley detection system to accurately detect the four-level Sync 2 portion of the FLEX frame. The PEAK AND VALLEY C WORD routine is implemented by the CPU 28 until the CPU determines at block 72 that either the C word or $\overline{C}$ word has been found. Once the C word or $\overline{C}$ word has been found, the CPU 28 proceeds to block 74 to call a PEAK AND VALLEY MAINTENANCE routine as depicted in FIG. 7A–7B. This routine is employed to more slowly but very accurately follow the four-level signal data of the FLEX frame. When the CPU 28 determines at block 76 that the decoding of one FLEX frame has been completed, the CPU 28 proceeds back to block 60 to wait until it is time to start the decoding of the next frame.

Figure 4:
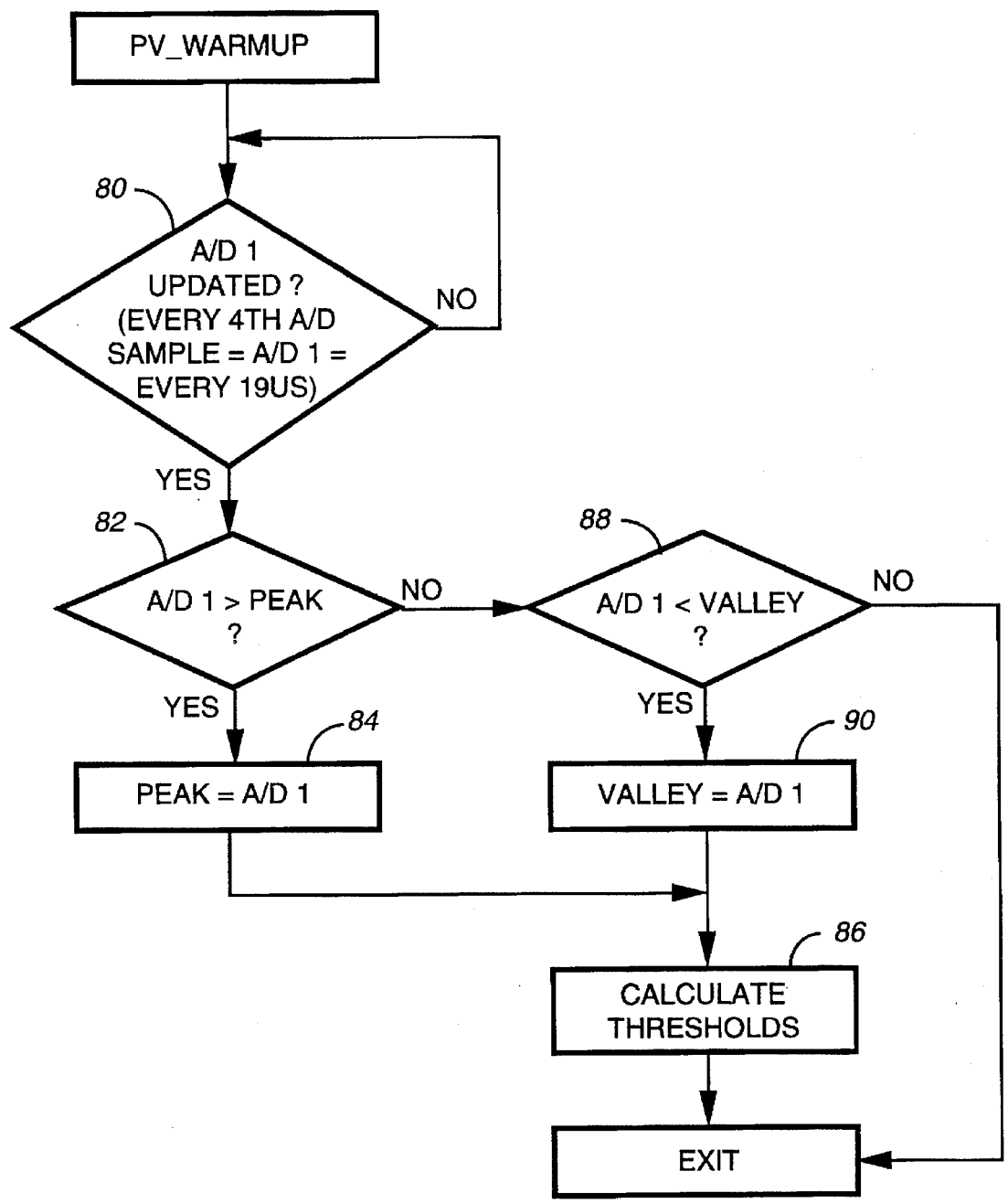
FIG. 4 is a flow chart illustrating a PEAK AND VALLEY WARM-UP routine called by the routine depicted in FIG. 3.

At the start of the PEAK VALLEY WARM-UP routine, as shown in FIG. 4, the microprocessor 28 initializes a PEAK variable as well as a VALLEY variable to 0. Thereafter, at block 80 the CPU 28 determines whether a received signal value, A/D1 has been updated wherein A/D1 is a sample from the A/D converter 27 taken, for example, every 19 microseconds. Next, the CPU 28 determines at block 82 whether the value A/D1 is greater than the PEAK variable. If so, which occurs upon the initialization of the routine, the CPU 28 proceeds to block 84 to set the PEAK variable value equal to the value of A/D1. If the CPU 28 determines at block 82 that the A/D1 value is not greater than the PEAK variable, the CPU 28, at block 88 determines whether the A/D1 value is less than the VALLEY variable. If so, the CPU 28 proceeds to block 90 to set the value of the VALLEY variable equal to the value of A/D1. Thereafter, the processor proceeds to block 86 to calculate the various thresholds in accordance with a CALCULATE THRESHOLDS routine as depicted in FIG. 8.

Figure 8:
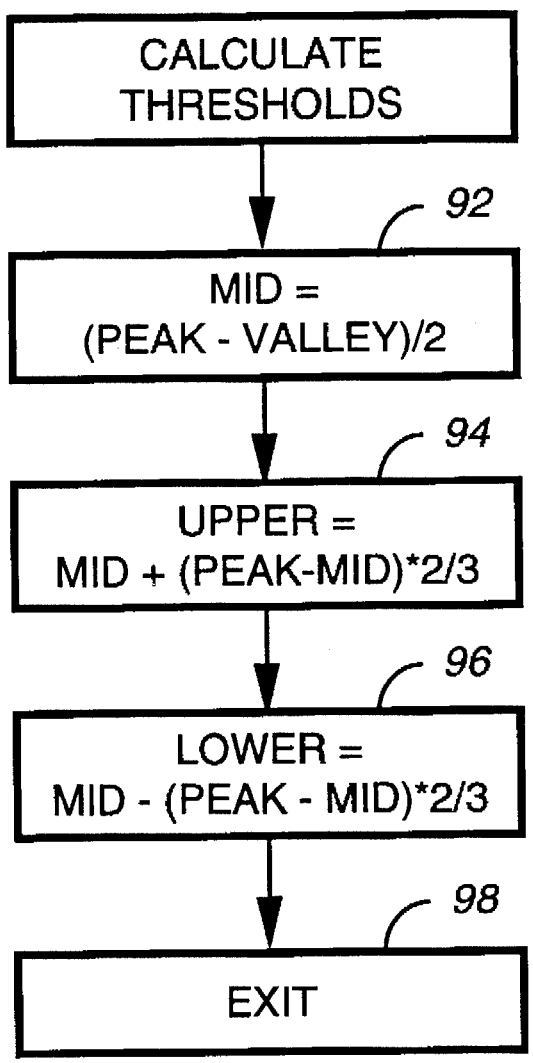
FIG. 8 is a flow chart illustrating a routine called by the routines depicted in FIGS. 4–7 for calculating thresholds used for decoding a received signal into symbols.

The CPU 28 upon entering the CALCULATE THRESHOLDS routine of FIG. 8 at block 92 sets the center threshold depicted in FIG. 2 and referred to herein as MID, equal to one-half of the difference between the PEAK and VALLEY variables. This value is stored in the threshold comparator 51 as the middle threshold reference value until a new value is calculated. Thereafter, the CPU 28 proceeds to block 94 to set the upper threshold shown in FIG. 2 equal to the center threshold, MID, plus two-thirds of the difference between the PEAK variable and the center threshold MID. The value for the upper threshold calculated at block 94 is stored in the upper threshold comparator 52 as the upper threshold reference value until a new value is calculated. Next, the CPU 28 sets the lower threshold at block 96 equal to the center threshold MID minus two-thirds of the difference between the PEAK variable and the center threshold MID. The value for the lower threshold calculated at block 96 is stored in the lower threshold comparator 50 as the lower threshold reference value until a new value is calculated. The CPU 28 then exits the routine at block 98. It is noted that the "two thirds" value used at blocks 94 and 96 is a programmable value that may be set to any fraction as desired so that values other than two thirds may be used.

After the system warm-up time has expired, the CPU 28 implements the PEAK AND VALLEY FAST routine shown in FIG. 5. Upon entering this routine, the CPU 28 determines at block 100 which of the samples from the analog to digital converter 27 is the closest to the center of a signal representing a bit of data. The received signal value A/D1 is set to the analog to digital converter 27 sample that is determined to be closest to the center of the bit and at block 102 the CPU 28 determines whether the A/D1 value is greater than the PEAK variable. If so, at block 104 the CPU 28 determines whether the A/D1 value is less than the sum of the PEAK variable and an attack constant, ATTACK. If the received signal value A/D1 is less than the sum of the PEAK variable plus the ATTACK constant, the CPU 28 proceeds from block 104 to block 106. At block 106 the CPU 28 sets the PEAK variable equal to the value of A/D1 which as described above represents the value of the signal corresponding approximately to the center of a bit. If the CPU 28 determines at block 104 that the A/D1 value is not less than the sum of the PEAK variable plus the ATTACK constant, the CPU proceeds to block 108 to update the PEAK variable by incrementing it by the ATTACK constant. If the CPU 28 determines that the A/D1 value is less than the PEAK variable at block 102 and is less than the VALLEY variable at block 110, the CPU 28 proceeds to block 112. At block 112, the CPU 28 determines whether the A/D1 value is greater than the difference between the VALLEY variable and the ATTACK constant. If so, the CPU 28 updates the VALLEY variable at block 114 by setting it equal to the A/D1 value. Otherwise, the CPU 28 proceeds from block 112 to block 116 to update the VALLEY variable by decrementing it by an amount equal to the ATTACK constant. It is noted that at blocks 106 and 114 the PEAK variable and the VALLEY variable are updated or attacking quickly whereas at blocks 108 and 116, the PEAK and VALLEY variables are attacking more slowly. It is noted that when the PEAK variable is attacking, the PEAK variable is increasing in the positive sense; whereas when the VALLEY variable is attacking, the VALLEY variable is increasing in the negative sense, i.e. becoming more negative. If the CPU 28 determines at blocks 102 and 110 that the received signal value A/D1 is between the PEAK variable and the VALLEY variable values, the CPU 28 proceeds from block 110 to block 118. At block 118, the CPU 28 updates the PEAK variable by decrementing it by a constant referred to as the DECAY constant so that the PEAK variable is decaying, i.e. decreasing. Thereafter, at a block 120, the VALLEY variable is updated by incrementing it by the DECAY constant so that the VALLEY is decaying, i.e. the VALLEY is becoming less negative. From blocks 106, 108, 114, 116 or 120, the CPU 28 proceeds to block 122 to calculate the various thresholds in accordance with the routine depicted in FIG. 8 and described above.

During the PEAK AND VALLEY C WORD routine shown in FIGS. 6A–6B, the CPU 28 sets the gth1 and gth0 bits of the Peak/Valley Control register respectively to 0,0 to accumulate in the Peak Average registers a value representing the average of 8 samples from the analog to digital converter 27 that are above the upper reference value stored in the upper threshold comparator. For this routine, the CPU 28 also sets the bits lth1 and lth0 respectively to 1,0 to accumulate all samples up to 8 to provide an average of 8 samples from the analog to digital converter 27 in the Valley Average registers.

Upon entering the PEAK AND VALLEY C WORD routine, the CPU 28 at block 124 determines whether the interrupt causing the CPU 28 to enter this routine was due to a peak accumulation i.e. the completion of the averaging of 8 samples from the analog to digital converter 27 that are above the upper reference value. If so, the CPU proceeds to block 126 to begin determining the value of the PEAK variable that represents the peak of the incoming i.e. received signal. More particularly, at block 126, the CPU 28 determines whether the peak average stored in the Peak Average registers of the RAM 32 is greater than the PEAK variable previously calculated. If so, the microprocessor 28 proceeds to block 128 to determine whether the received signal value representing the peak average is less than the sum of the PEAK variable plus the ATTACK constant. If the peak average is less than the sum of the PEAK variable and the ATTACK constant, the CPU 28 proceeds to block 130 to update the PEAK variable by setting it equal to the received signal value represented by the peak average. If the peak average is determined by the CPU 28 at block 128 to be greater than or equal to the sum of the PEAK variable and the ATTACK constant then the CPU proceeds from block 128 to block 132. At block 132 the CPU 28 updates the PEAK variable by incrementing it by an amount equal to the ATTACK constant. If the CPU 28 determines that the peak average is not greater than the PEAK variable at block 126, the CPU proceeds to block 134 to determine whether the peak average is greater than the difference between the PEAK variable and the DECAY constant. If the peak average is greater than the difference between the PEAK variable and the DECAY constant, the CPU 28 updates the PEAK variable by setting it equal to the peak average at block 130. Otherwise, the CPU 28 proceeds from block 134 to block 136 to update the PEAK variable by decrementing it by an amount equal to the DECAY constant.

If the CPU 28 determines that the interrupt causing the CPU to execute the PEAK AND VALLEY C WORD routine is the result of an all sample average calculation being completed by the accumulation of 8 samples of the analog to digital converter 27 in the Valley Average registers, the CPU 28 proceeds from block 138 to block 140. At block 140, the valley average is set equal to the value of the all sample average contained in the Valley Average registers minus the difference between the peak average contained in the Peak Average registers and the all sample average contained in the Valley Average registers. In effect, the CPU 28 at block 140 sets the valley average equal to two times the all sample average minus the peak average. After deriving the received signal value represented by the valley average calculated at block 140, the CPU at block 142 compares the received signal value represented by the valley average to the VALLEY variable if the valley average is less than the VALLEY variable, then the CPU 28 proceeds to block 144. At block 144, the CPU 28 determines whether the valley average is greater than the difference between the VALLEY variable and the ATTACK constant. If the valley average is greater than the VALLEY variable and the ATTACK constant, the CPU proceeds to block 146 to update the VALLEY variable by setting it equal to the valley average. Otherwise, the CPU proceeds from block 144 to block 148 to update the VALLEY variable by decrementing it by an amount equal to the ATTACK constant. If the CPU 28 determines at block 142 that the valley average is not less than the VALLEY variable, the CPU 28 proceeds to block 150 to determine whether the valley average is greater than the sum of the VALLEY variable plus the DECAY constant. If not, the VALLEY variable is updated by the CPU at block 146 to be equal to the valley average. If, however, the CPU determines at block 150 that the valley average is greater than the sum of the VALLEY variable and DECAY constant, the CPU 28 proceeds to block 152 to update the VALLEY variable by incrementing it by an amount equal to the DECAY constant. From blocks 138, 146, 148 or 152, the CPU proceeds to block 154 to calculate the thresholds in accordance with the routine depicted in FIG. 8.

The PEAK AND VALLEY MAINTENANCE routine as depicted in FIGS. 7A and 7B also utilizes the Peak and Valley registers of the RAM 32 as depicted in FIG. 9. For this routine, the CPU 28 sets the bits gth1 and gth0 respectively to 0,0 so that the peak average registers accumulate 8 samples from the analog to digital converter 27 that are above the upper reference value. Similarly, the bits lth1 and lth0 in the peak/valley control register are also set respectively to 0,0 so that the valley average registers accumulate only those samples from the analog to digital converter 27 that are less than the lower reference value.

Upon entering the PEAK AND VALLEY MAINTENANCE routine, the CPU 28 at block 160 first determines whether 5 msec. has elapsed. If so, the CPU proceeds from block 160 to block 162 to determine whether the peak accumulation in the peak average registers has been completed. If the peak accumulation has been completed so that a value representing the average of 8 samples above an upper threshold is accumulated, the CPU 28 determines at block 164 if this peak average is greater than the PEAK variable. If it is, the CPU 28 proceeds to block 166 to determine whether the peak average is less than the sum of the PEAK variable and the ATTACK constant. If the peak average is less than the sum of the PEAK variable and ATTACK constant, the CPU 28 updates the PEAK variable at block 168 by setting it equal to the peak average. If the peak average is not less than the sum of the PEAK variable and ATTACK constant, the CPU 28 at block 170 updates the peak value by incrementing it by an amount equal to the ATTACK constant. If the CPU 28 determines at blocks 164 and 172 that the peak average is less than or equal to the PEAK variable and greater than the difference between the PEAK variable and the DECAY constant, the CPU 28 proceeds from block 172 to block 168. At block 168 the CPU 28 updates the PEAK variable by setting it equal to the peak average. Otherwise, the CPU 28 proceeds from block 172 to block 174 to update the PEAK variable by decrementing it by an amount equal to the DECAY constant so that the PEAK variable begins decaying. If the CPU 28 determines at block 162 that the peak accumulation has not been completed, the CPU 28 proceeds from block 162 to block 178. At block 178, the CPU 28 decrements a tracking counter that, for a 3200 bps four-level signal, is initialized to 8. Thereafter, at block 180, the CPU 28 determines whether the tracking counter has been decremented to zero. If not, the CPU 28 proceeds to block 176. If the tracking counter has been decremented to zero as determined by the CPU 28 at block 180, the CPU 28 proceeds from block 180 to block 182. At block 182, the CPU 28 updates the PEAK variable by decrementing it by an amount equal to the DECAY constant so that the PEAK variable begins decaying. Thereafter, the CPU 28 at block 184 resets the counter. It is noted that the tracking counter may be set to various numbers depending on the frame speed and whether the signal is a two or a four-level signal. For example, for a frame speed of 1600 bps and a four-level signal, the counter may be set equal to 4.

The CPU 28 at the block 176 determines whether the valley average calculation has been completed by determining whether the valley average registers have accumulated 8 samples that are less than the lower threshold. If so, the CPU 28 proceeds from block 176 to block 186. At block 186 the CPU 28 determines whether the valley average represented by the average accumulated in the valley average registers is less than the VALLEY variable. If the valley average is less than the VALLEY variable, the CPU proceeds to block 188 to determine whether the valley average is greater than the VALLEY variable minus the ATTACK constant. If the valley average is greater than the VALLEY variable minus the ATTACK constant, the CPU 28 proceeds to block 190 to update the VALLEY variable by setting it equal to the valley average. Otherwise, the CPU at block 192 updates the VALLEY variable by decrementing it by an amount equal to the ATTACK constant. If the CPU 28 determines at blocks 186 and 196 that the valley average is greater than or equal to the VALLEY variable and greater than the VALLEY variable plus the DECAY constant, the CPU 28 proceeds from block 196 to block 198. At block 198, the CPU 28 updates the VALLEY variable by incrementing it by an amount equal to the DECAY constant. If the valley average is determined at block 196 to be less than or equal to the sum of the VALLEY variable and the DECAY constant, the CPU 28 updates the VALLEY variable at block 190 by setting it equal to the valley average. If the CPU 28 determines that the valley accumulation has not been completed at block 176, the CPU proceeds to block 197 to decrement a valley tracking counter which, for example, is set equal to 8 for a 3200 bps four-level signal. Thereafter, at block 199 the CPU 28 determines whether the valley tracking counter has been decremented to 0 and if so proceeds to block 200. At block 200, the VALLEY variable is updated by the CPU 28 incrementing the VALLEY variable by an amount equal to the DECAY constant. Thereafter, the CPU 28 at block 202 resets the valley tracking counter based on frame speed and level. From blocks 190, 192, 198, 199 or 202, the CPU 28 proceeds to block 204 to calculate the thresholds in accordance with the flow chart depicted in FIG. 8.

The peak and valley detecting system of the present invention as described above quickly and accurately detects and tracks the peak and valley of a two-level and/or four-level signal. It is noted that although the system was described in detail for a signal having the FLEX protocol, the system may be used with other signal protocols as well. In accordance with the present invention, the peak and valley variables will attack and decay based on the incoming signal i.e. the received signal value, which may be represented by a sample from the analog to digital converter 27 or which may be represented by a peak average or a valley average of the analog to digital converter samples as described above. Further, instead of non-varying attacking and decaying rates, the peak and valley detected in accordance with the present invention will attack and decay at variable rates up to but not more than the increase or decrease of the signal. In accordance with the PEAK AND VALLEY MAINTENANCE routine, for example, the PEAK and VALLEY variables will decay and attack independently so that if no peak has been detected for a specified amount of time, the PEAK will decay; however, the VALLEY variable may be either attacking or decaying. Further, with a four-level signal the peak and valley tracking counters allow longer series of no peaks or valleys. For example, the 3200 bps/four-level signal may require 20 ms (64 symbols) of no peaks before a decay will occur. Therefore, a signal could have no upper level symbols for a long time without moving the signal peak very far. The decision to decay depends on the signal expected. Since a 3200 bps four-level signal will typically have more peaks and valleys on average than a 1600 bps two-level signal, the time that the CPU 28 waits without seeing a peak or valley before decaying may be less for the 3200 four-level signal than the 1600 pbs two-level signal.

Many modifications and variations of the present invention are possible in light of the above teachings. Thus, it is to be understood that, within the scope of the appended claims, the invention may be practiced otherwise than as described hereinabove.

What is claimed is:

1. In a selective call receiving device, a system for detecting a peak and a valley of a received signal, comprising:
   a receiver for receiving a signal;
   a memory for storing a received signal value representing said received signal;
   a peak comparator for comparing said received signal value to a sum of a peak variable and an attack constant to determine if the received signal value is less than said sum; and
   a peak generator for setting said peak variable to a first value if said received signal value is less than said sum and to a second value if said received signal value is not less than said sum to update said peak variable, said first value being greater than said second value.

2. A selective call receiving device as recited in claim 1 further including:
   a valley comparator for comparing said received signal to a difference between a valley variable and an attack constant to determine if said received signal is greater than said difference; and
   a valley generator for setting said valley variable to a third value if said received signal value is greater than said difference and to a fourth value if said received signal is not greater than said difference to update said valley variable.

3. A selective call receiving device as recited in claim 2 wherein each of said first value and said third value is approximately equal to said received signal value.

4. A selective call receiving device as recited in claim 1 wherein said second value is approximately equal to said sum.

5. A selective call receiving device as recited in claim 2 wherein said fourth value is approximately equal to said difference.

6. A selective call receiving device as recited in claim 1 wherein said received signal value represents an average of a plurality of samples of said received signal and said first value is approximately equal to said average.

7. A selective call receiving device as recited in claim 6 including means for comparing said average to a difference between said peak variable and a decay constant to determine if said average is greater than said difference, said peak generator setting said peak variable approximately equal to said average if said average is greater than said difference and said peak generator setting said peak variable approximately equal to said difference if said average is less than said difference.

8. A selective call receiving device as recited in claim 6 wherein said received signal value represents an average of a number of samples of said received signal that are greater than a predetermined reference value.

9. A selective call receiving device as recited in claim 2 wherein said received signal value represents an average of a plurality of samples of said received signal.

10. A selective call receiving device as recited in claim 9 including means for comparing said average to a sum of said valley variable and a decay constant to make a determination if said sum of said valley variable and said decay constant is less than said average and if less than said average, said valley generator setting said valley variable approximately equal to said sum of said valley variable and decay constant and if not less than said average said valley generator setting said valley variable approximately equal to said average.

11. A selective call receiving device as recited in claim 9 wherein said average is approximately equal to two times an average of a predetermined number of samples of said received signal minus an average of a predetermined number of samples of said received signal that are greater than a predetermined reference value.

12. A selective call receiving device as recited in claim 2 including means for determining whether said received signal value is between said peak variable and said valley variable and further including means for decaying said peak variable and said valley variable in response to a determination that said received signal is between said peak variable and said valley variable.

13. A selective call receiving device as recited in claim 2 further including threshold setting means for setting a plurality of threshold levels utilized for decoding a received signal into a plurality of symbols, said threshold setting means setting a middle threshold approximately equal to one-half of the difference between said peak variable and said valley variable.

14. A selective call receiving device as recited in claim 13 wherein said threshold setting means sets a second threshold approximately equal to said middle threshold plus a first fraction of the difference between said peak variable and said middle threshold.

15. A selective call receiving device as recited in claim 14 wherein said threshold setting means sets a third threshold approximately equal to said middle threshold minus a second fraction of the difference between said peak variable and said middle threshold.

16. A selective call receiving device as recited in claim 15 wherein said first fraction and said second fraction are each set equal to two thirds.

17. In a selective call receiving device, a system for detecting a peak and valley of a received signal, comprising:
   a receiver for receiving a signal to provide a plurality of samples representative of the received signal;
   means for averaging a predetermined number of said samples that are greater than a predetermined upper reference value to provide a peak average representing said received signal;
   means for comparing said peak average to a peak variable to determine if said peak average is greater than said peak variable;
   means responsive to a determination that said peak average is greater than said peak variable for comparing said peak average to a sum of said peak variable and a peak attack constant to determine if said peak average is less than said sum; and
   a peak generator for setting said peak variable approximately equal to said peak average if said peak average is less than said sum and approximately equal to said sum if said peak average is not less than said sum.

18. A selective call receiving device as recited in claim 17 including means responsive to a determination that said peak average is not greater than said peak variable for comparing said peak average to a difference between said peak variable and a decay constant to determine if said peak average is greater than said difference, said peak generator setting said peak variable approximately equal to said peak average if said peak average is greater than said difference and approximately equal to said difference if said peak average is not greater than said difference.

19. A selective call receiving device as recited in claim 17 including
   means for averaging a predetermined number of said samples that are less than a predetermined lower reference to provide a valley average representing said received signal;
   means for comparing said valley average to a valley variable to determine if said valley average is less than said valley variable;
   means responsive to a determination that said valley average is less than said valley variable for comparing said valley average to a difference between said valley variable and a valley attack constant to determine if said valley average is greater than said difference; and
   a valley generator for setting valley variable approximately equal to said valley average if said valley average is greater than said difference and to said difference if said valley average is not greater than said difference.

20. A selective call receiving device as recited in claim 19 wherein said valley attack constant is approximately equal to said peak attack constant.

21. A selective call receiving device as recited in claim 19 including means responsive to a determination that said valley average is not less than said valley variable for comparing said valley average to a sum of said valley variable and a decay constant to determine if said valley average is greater than said sum, said valley generator setting said valley variable approximately equal to said valley average if said valley average is not greater than said sum and approximately equal to said sum if said valley average is greater than said sum.

22. A selective call receiving device as recited in claim 17 including
   means responsive to said samples of said received signal for determining a valley average;
   means for comparing said valley average to a valley variable to determine if said valley average is less than said valley variable;
   means responsive to a determination that said valley average is less than said valley variable for comparing said valley average to a difference between said valley variable and a valley attack constant to determine if said valley average is greater than said difference; and
   a valley generator for setting said valley variable approximately equal to said valley average if said valley average is greater than said difference and to said difference if said valley average is not greater than said difference.

23. A selective call receiving device as recited in claim 22 wherein said valley attack constant is approximately equal to said peak attack constant.

24. A selective call receiving device as recited in claim 22 including means responsive to a determination that said valley average is not less than said valley variable for comparing said valley average to a sum of said valley variable and a decay constant to determine if said valley average is greater than said sum, said valley generator setting said valley variable approximately equal to said valley average if said valley average is not greater than said sum and approximately equal to said sum if said valley average is greater than said sum.

25. A selective call receiving device as recited in claim 22 wherein said valley average determining means includes
   means for averaging a predetermined number of said samples to provide an all sample average; and
   means for calculating the difference between two times said all sample average and said peak average to provide said valley average.

26. In a selective call receiving device, a system for detecting a peak and valley of a received signal, comprising:
   a receiver for receiving a signal to provide a plurality of samples representative of the received signal;

means for averaging a predetermined number of said samples that are greater than a predetermined upper reference value to provide a peak average representing said received signal;

means for comparing said peak average to a peak variable to determine if said peak average is greater than said peak variable;

means responsive to a determination that said peak average is greater than said peak variable for comparing said peak average to a sum of said peak variable and peak attack constant to determine if said peak average is less than said sum; and a peak generator for attacking said peak variable at a first rate if said peak average is less than said sum and attacking said peak variable at a second rate if said peak average is not less than said sum, said first rate being faster than said second rate.

27. A selective call receiving device as recited in claim 26 including means for averaging a predetermined number of said samples that are less than a predetermined lower reference to provide a valley average representing said received signal;

means for comparing said valley average to a valley variable to determine if said valley average is less than said valley variable;

means responsive to a determination that said valley average is less than said valley variable for comparing said valley average to a difference between said valley variable and a valley attack constant to determine if said valley average is greater than said difference; and a valley generator for attacking said valley variable at a third rate if said valley average is greater than said difference and attacking said valley variable at a second rate if said valley average is not greater than said difference.

28. A method of detecting a peak and a valley of an incoming signal received by a selective call receiving device, comprising:

receiving an incoming signal;

storing a received signal value representing said received incoming signal;

comparing said received signal value to a sum of a peak variable and an attack constant to determine if the received signal value is less than said sum; and setting said peak variable to a first value if said received signal value is less than said sum; and setting said peak variable to a second value if said received signal value is not less than said sum, said first value being greater than said second value.

29. A method of detecting a peak and a valley of an incoming signal received by a selective call receiving device as recited in claim 28 further including the steps of:

comparing said received signal to a difference between a valley variable and an attack constant to determine if said received signal is greater than said difference; and setting said valley variable to a third value if said received signal value is greater than said difference and to a fourth value if said received signal is not greater than said difference.

30. A method of detecting a peak and a valley of an incoming signal received by a selective call receiving device as recited in claim 29 wherein each of said first value and said third value is approximately equal to said received signal value.

31. A method of detecting a peak and a valley of an incoming signal received by a selective call receiving device as recited in claim 28 wherein said second value is approximately equal to said sum.

32. A method of detecting a peak and a valley of an incoming signal received by a selective call receiving device as recited in claim 29 wherein said fourth value is approximately equal to said difference.

33. A method of detecting a peak and a valley of an incoming signal received by a selective call receiving device as recited in claim 28 wherein said received signal value represents an average of a plurality of samples of said received signal and said first value is approximately equal to said average.

34. A method of detecting a peak and a valley of an incoming signal received by a selective call receiving device as recited in claim 33 including the steps of comparing said average to a difference between said peak variable and a decay constant to determine if said average is greater than said difference; setting said peak variable approximately equal to said average if said average is greater than said difference; and setting said peak variable approximately equal to said difference if said average is less than said difference.

35. A method of detecting a peak and a valley of an incoming signal received by a selective call receiving device as recited in claim 33 including the step of averaging of a number of samples of said received signal that are greater than a predetermined reference value to provide said received signal value.

36. A method of detecting a peak and a valley of an incoming signal received by a selective call receiving device as recited in claim 29 including the step of averaging a plurality of samples of said received signal to provide said received signal value.

37. A method of detecting a peak and a valley of an incoming signal received by a selective call receiving device as recited in claim 36 including the steps of comparing said average to a sum of said valley variable and a decay constant to make a determination if said sum of said valley variable and said decay constant is less than said average and if less than said average, setting said valley variable approximately equal to said sum of said valley variable and decay constant and if not less than said average setting said valley variable approximately equal to said average.

38. A method of detecting a peak and a valley of an incoming signal received by a selective call receiving device as recited in claim 36 wherein said average is approximately equal to two times an average of a predetermined number of samples of said received signal minus an average of a predetermined number of samples of said received signal that are greater than a predetermined reference value.

39. A method of detecting a peak and a valley of an incoming signal received by a selective call receiving device as recited in claim 29 including the steps of determining whether said received signal value is between said peak variable and said valley variable and decaying said peak variable and said valley variable in response to a determination that said received signal is between said peak variable and said valley variable.

40. A method of detecting a peak and a valley of an incoming signal received by a selective call receiving device as recited in claim 29 further including the steps of setting a plurality of threshold levels utilized for decoding a received signal into a plurality of symbols, said plurality of threshold levels including a middle threshold set approximately equal to one-half of the difference between said peak variable and said valley variable.

41. A method of detecting a peak and a valley of an incoming signal received by a selective call receiving device as recited in claim 40 wherein said threshold setting step includes setting a second threshold approximately equal to said middle threshold plus a first fraction of the difference between said peak variable and said middle threshold.

42. A selective call receiving device as recited in claim 41 wherein said threshold setting step includes setting a third threshold approximately equal to said middle threshold minus a second fraction of the difference between said peak variable and said middle threshold.

43. A selective call receiving device as recited in claim 42 wherein said first fraction and said second fraction are each set equal to two thirds.

44. In a selective call receiving device, a system for detecting a peak and valley of a received signal, comprising:
   a receiver for receiving an analog signal;
   an analog to digital converter for converting said analog signal into a plurality of digital samples;
   a control register for storing programmable data defining criteria for a digital sample to be averaged into a peak average;
   a peak averaging circuit for providing a peak average by averaging a predetermined number of digital samples meeting the criteria defined by said data stored in said control register for a digital sample to be averaged into a peak average;
   means for comparing said peak average to a peak variable to determine if said peak average is greater than said peak variable;
   means responsive to a determination that said peak average is greater than said peak variable for comparing said peak average to a sum of said peak variable and peak attack constant to determine if said peak average is less than said sum; and
   a peak generator for attacking said peak variable at a first rate if said peak average is less than said sum and attacking said peak variable at a second rate if said peak average is not less than said sum, said first rate being faster than said second rate.

45. A selective call receiving device as recited in claim 44 wherein said peak averaging circuit includes a first register and a second register for accumulating the sum of digital symbols to be averaged into a peak average, the first register storing the most significant bits of said summation and said second register storing said least significant bits of said sum wherein the number of said most significant bits stored in said first register is equal to the predetermined number of digital samples to be averaged and said most significant bits represent said peak average.

46. A selective call receiving device as recited in claim 44 including an upper threshold comparator for comparing a digital sample to an upper threshold reference value and wherein said criteria for a digital sample to be averaged into a peak average requires that said digital sample be greater than said upper threshold reference value.

47. A selective call receiving device as recited in claim 46 including a middle threshold comparator for comparing a digital sample to a middle threshold reference value that is less than said upper threshold reference value and wherein said criteria for a digital sample to be averaged into a peak average requires that said digital sample be greater than said middle reference value.

48. A selective call receiving device as recited in claim 44 wherein said criteria requires all of said digital samples to be averaged into a peak average.

49. A selective call receiving device as recited in claim 44 wherein said control register stores programmable data defining criteria for a digital sample to be averaged into a valley average and including:
   a valley averaging circuit for providing a volley average by averaging a predetermined number of digital samples meeting the criteria defined by said data stored in said control register for a digital sample to be averaged into a valley average;
   means for comparing said valley average to a valley variable to determine if said valley average is less than said valley variable;
   means responsive to a determination that said valley average is less than said valley variable for comparing said valley average to a difference between said valley variable and a valley attack constant to determine if said valley average is grater than said difference; and
   a valley generator for attacking said valley variable at a third rate if said valley average is grater than said difference and attacking said valley variable at a second rate if said valley average is not greater than said difference.

50. A selective call receiving device as recited in claim 49 wherein said valley averaging circuit includes a first register and a second register for accumulating the sum of digital symbols to be averaged into a valley average, the first register storing the most significant bits of said summation and said second register storing said least significant bits of said sum wherein the number of said most significant bits stored in said first register is equal to the predetermined number of digital samples to be averaged and said most significant bits represent said valley average.

51. A selective call receiving device as recited in claim 49 including a lower threshold comparator for comparing a digital sample to a lower threshold reference value and wherein said criteria for a digital sample to be averaged into a valley average requires that said digital sample be less than said lower threshold reference value.

52. A selective call receiving device as recited in claim 51 including a middle threshold comparator for comparing a digital sample to a middle threshold reference value that is greater than said lower threshold reference value and wherein said criteria for a digital sample to be averaged into a valley average requires that said digital sample be less than said middle threshold reference value.

53. A selective call receiving device as recited in claim 49 wherein said criteria requires all of said digital samples to be averaged into a valley average.

54. In a selective call receiving device, a system for detecting a peak and a valley of a received signal comprising:
   a receiver for receiving an analog signal;
   an analog to digital converter for converting said analog signal into a plurality of digital samples;
   a plurality of threshold comparators each comparator comparing a digital sample to a respective threshold reference value stored in said comparator to provide a signal indicative of whether said digital sample is greater than said respective threshold reference value;
   a control register for storing programmable data defining criteria for a digital sample to be averaged into a peak average and for a digital sample to be averaged into a valley average based upon at least one signal provided by one of said threshold comparators or independent from said threshold comparators;
   a peak averaging circuit for averaging a predetermined number of digital samples meeting the criteria defined by said data stored in said control register for a digital sample to be averaged into a peak average; and a valley averaging circuit for averaging a predetermined number of digital samples meeting the criteria defined by said data stored in said control register for a digital sample to be averaged into a valley average.

55. A selective call receiving device as recited in claim 54 wherein said peak averaging circuit includes a first register and a second register for accumulating the sum of digital symbols to be averaged into a peak average, the first register storing the most significant bits of said summation and said second register storing said least significant bits of said sum wherein the number of said most significant bits stored in said first register is equal to the predetermined number of digital samples to be averaged and said most significant bits represent said peak average.

56. A selective call receiving device as recited in claim 54 wherein said valley averaging circuit includes a first register and a second register for accumulating the sum of digital symbols to be averaged into a valley average, the first register storing the most significant bits of said summation and said second register storing said least significant bits of said sum wherein the number of said most significant bits stored in said first register is equal to the predetermined number of digital samples to be averaged and said most significant bits represent said valley average.

57. A selective call receiving device as recited in claim 54 wherein said plurality of threshold comparators includes an upper threshold comparator for comparing a digital sample to an upper threshold reference value and a lower threshold comparator for comparing a digital sample to a lower threshold reference value.

58. A selective call receiving device as recited in claim 57 wherein said plurality of threshold comparators includes a middle threshold comparator for comparing a digital sample to a middle threshold reference value that is less than said upper threshold reference value and greater than said lower threshold reference value.

59. A selective call receiving device as recited in claim 54 wherein said plurality of threshold comparators includes an upper threshold comparator for comparing a digital sample to an upper threshold reference value and said criteria for a digital sample to be averaged into a peak average requires that said digital sample be greater than said upper threshold reference value.

60. A selective call receiving device as recited in claim 59 wherein said plurality of threshold comparators includes a middle threshold comparator for comparing a digital sample to a middle threshold reference value that is less than said upper threshold reference value and said criteria for a digital sample to be averaged into a peak average requires that said digital sample be greater than said middle threshold reference value.

61. A selective call receiving device as recited in claim 54 wherein said plurality of threshold comparators includes a lower threshold comparator for comparing a digital sample to a lower threshold reference value and said criteria for a digital sample to be averaged into a valley average requires that said digital sample be less than said lower threshold reference value.

62. A selective call receiving device as recited in claim 61 wherein said plurality of threshold comparators includes a middle threshold comparator for comparing a digital sample to a middle threshold reference value that is greater than said lower threshold reference value and said criteria for a digital sample to be averaged into a valley average requires that said digital sample be less than said middle threshold reference value.

63. A selective call receiving device as recited in claim 54 wherein one criteria that is independent from said threshold comparators requires all of said digital samples to be averaged into a peak average.

64. A selective call receiving device as recited in claim 54 wherein one criteria that is independent from said threshold comparators requires all of said digital samples to be averaged into a valley average.

65. A selective call receiving device as recited in claim 54 including:

means for comparing said peak average to a peak variable to determine if said peak average is greater than said peak variable;

means responsive to a determination that said peak average is greater than said peak variable for comparing said peak average to a sum of said peak variable and peak attack constant to determine if said peak average is less than said sum; and a peak generator for attacking said peak variable at a first rate if said peak average is less than said sum and attacking said peak variable at a second rate if said peak average is not less than said sum, said first rate being faster than said second rate.

66. A selective call receiving device as recited in claim 54 including:

means for comparing said valley average to a valley variable to determine if said valley average is less than said valley variable;

means responsive to a determination that said valley average is less than said valley variable for comparing said valley average to a difference between said valley variable and a valley attack constant to determine if said valley average is greater than said difference; and a valley generator for attacking said valley variable at a third rate if said valley average is greater than said difference and attacking said valley variable at a second rate if said valley average is not greater than said difference.

67. A selective call receiving device as recited in claim 54 wherein said threshold reference values are variable.

68. A selective call receiving device as recited in claim 67 including means responsive to said peak average and said valley average for determining said threshold reference values.

* * * * *

UNITED STATES PATENT AND TRADEMARK OFFICE
CERTIFICATE OF CORRECTION

PATENT NO. : 5,627,860
DATED : May 6, 1997
INVENTOR(S) : McKinny et al.

It is certified that error appears in the above-indentified patent and that said Letters Patent is hereby corrected as shown below:

Claim 49, Column 18, line 17, change "grater" to --greater--.

Claim 49, Column 18, line 19, change "grater" to --greater--.

Claim 66, Column 20, line 47, change "third" to --first--.

Signed and Sealed this

Twenty-sixth Day of May, 1998

*Attest:*

BRUCE LEHMAN

*Attesting Officer*      *Commissioner of Patents and Trademarks*